US012567992B2

(12) United States Patent
Chamas et al.

(10) Patent No.: US 12,567,992 B2
(45) Date of Patent: Mar. 3, 2026

(54) SYSTEM FOR DATA TRANSMISSION IN A MOTOR VEHICLE, MOTOR VEHICLE AND METHOD

(71) Applicant: Bayerische Motoren Werke Aktiengesellschaft, Munich (DE)

(72) Inventors: Mohamad Chamas, Munich (DE); Florian Brummer, Geisenfeld (DE); Helmut Kellermann, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 379 days.

(21) Appl. No.: 18/042,275

(22) PCT Filed: Sep. 8, 2021

(86) PCT No.: PCT/EP2021/074695
§ 371 (c)(1),
(2) Date: Feb. 20, 2023

(87) PCT Pub. No.: WO2022/058216
PCT Pub. Date: Mar. 24, 2022

(65) Prior Publication Data
US 2024/0031197 A1      Jan. 25, 2024

(30) Foreign Application Priority Data

Sep. 21, 2020    (DE) ..................... 10 2020 124 549.1

(51) Int. Cl.
*H04L 12/40*          (2006.01)
*H04L 12/46*          (2006.01)
(52) U.S. Cl.
CPC .... *H04L 12/40* (2013.01); *H04L 2012/40215* (2013.01); *H04L 2012/40241* (2013.01); *H04L 2012/40273* (2013.01)

(58) Field of Classification Search
CPC .............. H04L 12/40; H04L 12/40202; H04L 2012/40215; H04L 2012/40241;
(Continued)

(56) References Cited

U.S. PATENT DOCUMENTS

2005/0265344 A1* 12/2005 Harris ............... H04L 12/40032
                                                                          370/392
2007/0268991 A1* 11/2007 Watkins ................ H04L 69/323
                                                                          375/356
(Continued)

FOREIGN PATENT DOCUMENTS

DE       102008060984 A1      6/2010
DE       102011005515 A1      1/2012
(Continued)

OTHER PUBLICATIONS

International Search Report corresponding to International Patent Application No. PCT/EP2021/074695, dated Dec. 21, 2021 (4 pages).

(Continued)

*Primary Examiner* — Jenee Holland
(74) *Attorney, Agent, or Firm* — Maginot, Moore & Beck LLP

(57)          ABSTRACT

A system for data transmission in a motor vehicle includes a central control unit, a first zonal control module, and a first LIN bus. The central control unit includes at least a first LIN master and a second LIN master. The first zonal control module is operably coupled to the central control unit via a first data connection. The first LIN bus is operably coupled to the first zonal control module. A first LIN slave connected to the LIN bus is assigned to the first LIN master, and a second LIN slave connected to the LIN bus is assigned to the second LIN master.

17 Claims, 6 Drawing Sheets

(58) Field of Classification Search
CPC . H04L 2012/40273; H04L 2012/40202; H04L 2012/40234
See application file for complete search history.

(56) References Cited

U.S. PATENT DOCUMENTS

| | | | | |
|---|---|---|---|---|
| 2009/0307400 | A1* | 12/2009 | Machauer | H04L 67/12 710/110 |
| 2010/0146174 | A1* | 6/2010 | Djordjevic | H04L 63/126 710/110 |
| 2011/0223955 | A1* | 9/2011 | Kobayashi | H04L 12/4625 455/513 |
| 2012/0084378 | A1* | 4/2012 | Kaneko | H04L 12/4035 709/208 |
| 2014/0223048 | A1* | 8/2014 | Troeger | G06F 13/4286 710/106 |
| 2015/0124839 | A1* | 5/2015 | Kim | H04L 69/18 370/467 |
| 2015/0169481 | A1* | 6/2015 | Harres | H04L 12/40182 710/110 |
| 2016/0277208 | A1* | 9/2016 | Petrucci | G08C 23/04 |
| 2017/0170900 | A1* | 6/2017 | Petrucci | H04B 10/27 |
| 2017/0359195 | A1 | 12/2017 | Bender et al. | |
| 2018/0212822 | A1 | 7/2018 | Ikeda et al. | |
| 2019/0064408 | A1* | 2/2019 | Smit | G02B 5/23 |
| 2019/0158310 | A1* | 5/2019 | Hustava | H04L 12/40019 |
| 2019/0334739 | A1* | 10/2019 | Nakamura | H04L 12/40202 |
| 2019/0385057 | A1* | 12/2019 | Litichever | H04L 63/14 |
| 2019/0394089 | A1* | 12/2019 | Barrett | G06F 8/75 |
| 2020/0247471 | A1* | 8/2020 | Grodde | B60W 50/045 |
| 2021/0004304 | A1* | 1/2021 | Chatziioannou | G06F 11/2033 |
| 2021/0157388 | A1* | 5/2021 | Kulandaivel | G06F 1/08 |
| 2021/0203725 | A1* | 7/2021 | McCann | H04W 52/0203 |
| 2022/0046108 | A1* | 2/2022 | Evers | H04L 67/566 |
| 2022/0319255 | A1* | 10/2022 | Palai | G07C 5/0808 |
| 2022/0350773 | A1* | 11/2022 | Ryan | G06F 1/14 |

FOREIGN PATENT DOCUMENTS

| | | | |
|---|---|---|---|
| EP | 3258652 | A1 | 12/2017 |
| JP | 2010136286 | A | 6/2010 |
| JP | 201355534 | A | 3/2013 |

OTHER PUBLICATIONS

Written Opinion corresponding to International Patent Application No. PCT/EP2021/074695, dated Dec. 21, 2021 (8 pages).
German Search Report corresponding to German Patent Application No. 10 2020 124 549.1, dated Jul. 28, 2021 (8 pages).
Local Interconnect Network. In: Wikipedia, Die freie Enzyklopädie. Bearbeitungsstand: Sep. 1, 2020, 11:50 UTC. URL: https://en.wikipedia.org/wiki/Local_Interconnect_Network [abgerufen am 27.07.2021] (9 Pages).

* cited by examiner

Transmit first header information

Transmit second header information

Receive response information corresponding to the first header information

Receive response information corresponding to the second header information

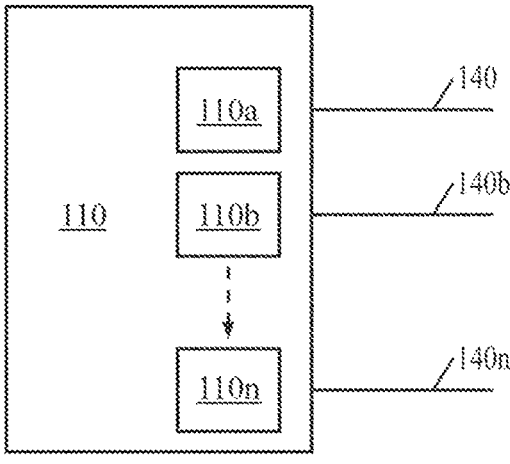
Fig. 7     (S.d.T.)
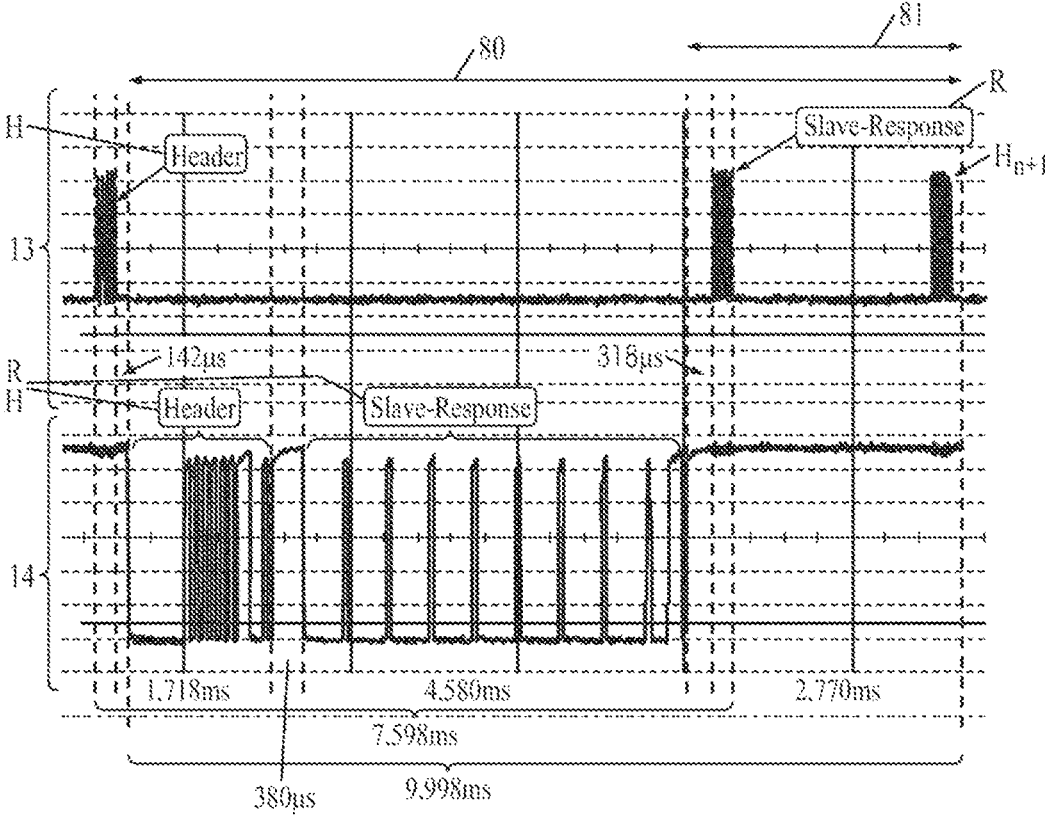
Fig. 8

SYSTEM FOR DATA TRANSMISSION IN A MOTOR VEHICLE, MOTOR VEHICLE AND METHOD

The present application is the U.S. national phase of PCT Application PCT/EP2021/074695 filed on Sep. 8, 2021, which claims priority of German patent application No. 102020124549.1 filed on Sep. 21, 2020, which is incorporated herein by reference in its entirety.

TECHNICAL FIELD

Exemplary embodiments relate generally to the field of data transmission in a motor vehicle, and more particularly to systems and methods for activating LIN modules connected to a LIN bus.

BACKGROUND

In motor vehicles, different devices of the motor vehicle are activated via data connections or bus systems. Known buses which are used in motor vehicles are, for example, LIN (Local Interconnect Network) buses, CAN (Controller Area Network) buses or FlexRay buses. In addition, discrete signals can also be transmitted in the cable harness through the entire vehicle. The buses are normally functionally designed, i.e. control units representing common functions are linked together on a bus.

A LIN system is made up of a master (LIN master) and one or more slaves (LIN slaves). The master is designed e.g. as a microcontroller which, for example as a bridge, can connect the LIN to a CAN bus. On the LIN, the master determines the (e.g. permanently configured) temporal sequence of all messages by transmitting their start, known as a header. One or more LIN slaves are therefore serially connected to the LIN master via a LIN bus. The transmission protocol provides the transmission of the headers from the LIN master to the LIN slaves. The addressed LIN slave transmits a response to the header back to the LIN master within a provided time slot (e.g. every 5 ms or 10 ms on the LIN bus). The header and response are combined into a frame which is transmitted within the time period of the provided time slot.

In the case of control units for activating a plurality of devices or slaves having different functions in motor vehicles in which LIN buses are used, an increasing number of LIN buses are required which are installed in the vehicle as transmission cables in a cable bundle or cable harness. Due to the large number of LIN buses, a circumference or cross section of the cable harness can be large, so that it can be difficult to accommodate the cable harness in the limited space of the motor vehicle.

SUMMARY

An object is to provide improved concepts for the transmission of signals for activating control units, in particular slaves, in a local network with legacy buses or discrete data lines, in particular with LIN buses, for example in a vehicle.

This object is achieved by advantageous embodiments described in the the following description and in conjunction with the figures.

A system for data transmission in a motor vehicle is accordingly proposed. The system comprises a central control unit in which at least a first LIN master and a second LIN master are formed. The system further comprises at least one zonal control module which is coupled to the central control unit by means of a first data connection. The system further comprises a LIN bus (e.g. as a second data connection of the system) which is coupled to the zonal control module. It is provided that a first LIN slave connected to the LIN bus is assigned to the first LIN master, and that a second LIN slave connected to the LIN bus is assigned to the second LIN master.

By means of the system, at least two LIN slaves which are assigned to different LIN masters can therefore use a common LIN bus. As a result, in contrast to other systems, at least one LIN bus can be eliminated, whereby e.g. cables required for LIN buses can be sparingly used. A plurality of LIN masters, for example, which can activate a multiplicity of LIN slaves assigned to them in each case on the common LIN bus can also be arranged in the central control unit. In contrast to other systems, it is e.g. not necessary also to provide a separate LIN bus for each individual LIN master.

The use of the first data connection can enable a more efficient design of a data transmission from the central control unit to the zonal control module. The LIN bus itself, for example, does not have to be routed through to the central control unit. The first data connection, for example, via which, along with LIN information, other signals or information can also be transmitted (e.g. general on-board power supply connection, e.g. Ethernet connection or CAN connection), can be used instead. The data transmission via the first data connection can result in a reduced overall cable requirement in the vehicle due to higher efficiency (e.g. higher data transmission speed in contrast to the LIN bus data transmission).

As an alternative to the design with the LIN bus technology also shown below by way of example, other legacy buses (e.g. CAN bus and/or FlexRay bus) and/or discrete data lines can also be additionally or alternatively connected to the zonal control module. A module, for example, for receiving signals from the respective control units and for transmitting signals to the respective control units can then be provided accordingly in the central control unit instead of the LIN masters or in addition to the LIN masters.

In this way, different types of bus systems can be functionally integrated into one central control unit. The zonal control module can act e.g. as a gateway between legacy buses and the first data connection (e.g. Ethernet connection) in order to enable compatibility between the different technologies. In particular, the proposed system can enable the connection of any legacy bus to the zonal control module in order to enable a backbone tunnelling of respective signals (e.g. signals according to CAN/FlexRay/LIN/etc.) via the first data connection (e.g. Ethernet), thus enabling a flexible, e.g. zonalized, system.

According to one aspect, it is provided that the system comprises at least one further zonal control module which is coupled to the central control unit via the first data connection. At least one further legacy bus, in particular a LIN bus, is further provided which is coupled to the further zonal control module. It is provided that at least one LIN slave assigned to the first LIN master and/or assigned to the second LIN master is connected to the further LIN bus of the further zonal control module.

The system can thus be designed e.g. zonally, for example with one or more zones in which legacy buses, in particular LIN buses (e.g. LIN buses jointly used by different LIN masters) of the system are arranged in a distributed manner. Two or more zonal control modules can be provided accordingly in the system. The joint use of the first data connection by a plurality of zonal control modules can further increase the efficiency of the data transmission via the first data connection. Instead of a plurality of LIN buses, the first data connection, for example, can suffice to transmit LIN information (e.g. header information and/or response information) between the central control unit and the zonal control modules.

Slaves which are assigned to a specific LIN master can be connected to the different LIN buses, e.g. to each LIN bus. A substantial cable requirement for a physically very long LIN bus can be eliminated due to the zonal concept. Instead, the LIN master can advantageously activate its LIN slaves on different local LIN buses. The total physical length of the sum of the local zonal LIN buses can be reduced e.g. due to the use of the first data connection in contrast to a total physical length of a LIN bus required in other LIN systems.

It can be provided, for example, that the zonal control modules are designed in each case to filter out only those headers of the LIN masters transmitted via the first data connection which are addressed to LIN slaves which are connected to the respective LIN bus of the zonal control module. Headers or header information, for example, can be transmitted via the first data connection for all LIN slaves of the system. The filter prevents header information which is not intended for transmission on a LIN bus of a specific zonal control module from being accepted by this specific zonal control module or by a signal branch within the specific zonal control module.

It can further be provided that the zonal control module (e.g. the filter of the zonal control module) is designed to filter out duplicate messages, e.g. redundantly transmitted headers, also. A bus load of the LIN bus can thereby be reduced since redundancies can be avoided and therefore fewer messages have to be transmitted via the LIN bus. In some instances, the joint use of the LIN bus can cause delays in the transmission of response information, so that header information can be transmitted in duplicate. The filtering out of redundant information can, in particular, offer advantages in the system with one LIN bus used by a plurality of LIN masters, since the transmission capacity of the LIN bus must be taken into account due to the plurality of masters.

It can be provided, for example, that precisely one LIN bus is coupled to the zonal control module. In contrast to other concepts, it is e.g. not necessary, due to the joint use of the one LIN bus, to provide separate LIN buses in each case for LIN slaves of different LIN masters. A cable requirement for LIN buses in one zone of the system, for example, can be reduced through the use of precisely one LIN bus for each zonal control module.

It can be provided, for example, that the zonal control module is designed to control the temporal sequence in which headers of the first LIN master and the second LIN master received on the zonal control module are transmitted from the zonal control module onto the LIN bus according to a communication behavior (e.g. according to a transmission protocol; e.g. according to a regulation for the transmission of data). Through the joint data transmission of LIN information from a plurality of LIN masters it is e.g. necessary to provide a suitable scheduling for the data transmission via the first data connection and/or the LIN bus. The communication behavior can be defined e.g. synchronously or asynchronously.

According to one example, it can be provided that the communication behavior provides asynchronous transmission in which a LIN master transmits no further header as long as it has not received a response corresponding to the most recently transmitted header which is transmitted from the LIN slave via the LIN bus, the zonal control module and the first data connection to the LIN master. A first LIN master, for example, transmits first header information via the first data connection between the central control unit and the zonal control module, and transmits second, subsequent header information only if response information corresponding to the first header information has been received in the central control unit via the first data connection.

This synchronous communication behavior can be provided, for example, for the data transmission to LIN slaves of a first zonal control module. The LIN master can, for example, transmit first header information to a second zonal control module even if the response information from the LIN slave has not yet been received by the first zonal control module. The synchronous data transmission for respective zonal control modules can avoid an overload of the LIN bus on the respective zonal control module. However, if header information is transmitted to a second zonal control module, this does not relate to the bus load of the LIN bus of the first zonal control module.

It can alternatively be provided, for example, that the communication behavior provides asynchronous transmission in which a LIN master transmits a further header even if it has not yet received a response corresponding to the most recently transmitted header. It can be provided that the zonal control module transmits the response together with the associated header (e.g. an associated header ID; e.g. a header ID and/or protected identifier PID) via the first data connection to the LIN master in order to enable an assignment of the response to the header on the LIN master.

The asynchronous communication behavior can allow e.g. a more flexible transmission of header information to LIN slaves. If e.g. a plurality of LIN masters simultaneously transmit header information to a zonal control module, it may take a certain time until all header information is transmitted via the common LIN bus (e.g. the header information still to be processed can be temporarily stored in a memory of the zonal control module until it is transmitted via the LIN bus, see following related description also). If a LIN master wished to transmit header information with a higher urgency in this time, it would have to wait according to the synchronous transmission behavior until it had received the previous response information. Conversely, the asynchronous transmission behavior can enable e.g. a prioritization of header information. The LIN master can, for example, transmit header information e.g. with a higher priority to the zonal control module before it has received the response information to one previous (or to a plurality of previous) header information elements. A transmission control (e.g. scheduling) on the zonal control module can preferably transmit e.g. the header information with a higher priority onto the LIN bus. Urgent header information can thus be transmitted in a prioritized manner e.g. also on the jointly used LIN bus with a high bus utilization, and a transmission duration of such important header information can be reduced.

It can be provided, for example, that the system has a plurality of LIN masters in the central control unit and a plurality of zonal control modules with respective LIN buses. The system can have a high design flexibility, e.g. through the use of the first data connection. The number of zonal control modules and/or LIN masters can thus be selected appropriately each case for a required application.

It can be provided, in particular, that the number of LIN buses on zonal control modules of the system is greater than the number of LIN masters of the system. A risk of overloading the transmission capacity of the individual LIN buses, for example, can thereby be reduced. LIN slaves of a LIN master can, for example, be arranged in a distributed manner on the different LIN buses. A temporally distributed use of the LIN buses by a LIN master can thereby be implemented, so that, at least in the statistical mean, availability of the LIN buses also exists for the transmission of information from other LIN masters. Due to the higher number of LIN buses in contrast to LIN masters, a buffer, for example, can be provided in connection with the transmission capacity of the LIN buses, which may be necessary e.g. if the LIN buses are not used in an equally distributed manner by the LIN masters.

According to one exemplary embodiment, it can be provided that the zonal control module has a buffer memory (e.g. in a schedule module) in order to be able to temporarily store a header received from a LIN master until the intended LIN bus is available for the transmission of this header. As already mentioned, the joint use of the LIN bus can result in a temporary overloading of the transmission capacity of the LIN bus. This can be avoided by means of the buffer memory. A control unit (e.g. dispatcher) can determine the sequence in which header information stored in the buffer memory is transmitted onto the LIN bus. As described above, the transmission can be performed e.g. synchronously or asynchronously. The control unit can also be designed to delete redundant messages present in the buffer memory so that e.g. a bus utilization is not increased unnecessarily by the repeated transmission of the same messages.

It can further be provided, for example, that the zonal control module is designed to transmit error information relating to the LIN bus and/or the first data connection to the LIN masters of the central control unit. This can enable the use of a conventional LIN error management in the proposed zonal system also. Compatibility of the proposed system with other LIN systems can thereby be achieved. It is necessary, for example, to make error information transmitted by a LIN slave available on the assigned LIN master. The proposed zonal control module can, for example, embed the respective error information into a data format of the first data connection in order to forward it to the LIN master.

It can be provided, for example, that a data transmission speed of the first data connection between the central control unit and the zonal control module is higher than a data transmission speed of the LIN bus.

Due to the higher data transmission speed of the first data connection in contrast to the LIN bus, header information (e.g. for transmission as a header via the LIN bus) and response information (which has been transmitted e.g. as a response via the LIN bus) can be exchanged more quickly between the central control unit and a zonal control module. As a result, a plurality of zonal control modules can be connected to the central control unit. A plurality of header information elements, for example, can be transmitted via the first data connection during a predefined time slot of a LIN bus (e.g. 5 ms slot or 10 ms slot provided for LIN transmission). This can be advantageous, for example, if a plurality of LIN slaves which are activated by respective LIN masters of the central control unit are connected to the LIN bus of a zonal control module.

The proposed system thus enables, for example, information from the LIN master which is intended to be transmitted via the LIN bus to be transmitted initially via a faster connection to the zonal control module from which the information is forwarded onto the slower LIN bus. In contrast to conventional systems, it is thus provided to arrange the LIN master in a central, separate control unit rather than directly in the zonal control module.

In contrast to conventional systems, a multiplicity of transmission cables of a multiplicity of LIN buses can be eliminated between the central control unit and the zonal control module through the use of the faster first data connection since header information and response information from a plurality of LIN buses can be transmitted e.g. via a common transmission cable of the first data connection. This can be done e.g. without causing a time delay in the transmission via the first data connection. A cable harness between the central control unit and the zonal control module, for example, can advantageously be reduced (e.g. smaller diameter or smaller cross-section area of the cable harness) through the use of the first data connection.

According to one exemplary embodiment, it is provided that the data transmission speed of the first data connection corresponds to at least 10 times (or 20 times or 50 times) the data transmission speed of the LIN bus. A faster transmission speed of this type via the first data connection enables e.g. a higher number of LIN buses (e.g. a corresponding number of zonal control modules) to be operated by means of LIN masters which are arranged in the central control unit. The transmission, for example, of further information (e.g. additional information and/or information differing from header information and response information) is also enabled, e.g. without resulting in collisions or delays in the transmission via the first data connection.

The first data connection can be designed, for example, according to an Ethernet standard, a CAN standard, a FlexRay standard, a radio-based transmission standard (e.g. WLAN, 4G, 5G or Bluetooth), a PCI Express standard or a home network standard (e.g. HomeGrid—G.hn). The use of these standards can enable a required data transmission speed of the first data connection.

According to one exemplary embodiment, it is provided that the LIN master and/or the LIN slave is designed using hardware-supported microcontrollers. Functions can generally be implemented on microcontrollers by means of software or using predefined hardware blocks. Software solutions can offer the advantage that they can be modified more flexibly or can perform a plurality of functions, whereas the physical hardware blocks, once implemented, can be used for the respectively intended function only. Conversely, in the case of a hardware-supported implementation, e.g. a required implementation duration can be more precisely adhered to (e.g. a process duration can be better planned) since e.g. no other processes can delay an implementation (as in the case, for example, of software solutions).

A tolerance time is provided in each case according to the LIN transmission standard for the transmission of LIN information (e.g. frame; e.g. header and response). An actually required transmission duration (e.g. maximum header transmission duration) can be up to 40% greater than a nominal transmission duration. In the case of the intended use of fixed time slots (e.g. 5 ms or 10 ms slots) for transmission via the LIN bus, a free time window thus occurs in a time slot of a frame if the reserved tolerance time is not required due to effective transmission mechanisms. If hardware-supported microcontrollers are used for the implementation of the LIN master and/or LIN slave, the nominal transmission times can be adhered to, or at least not all of the reserved tolerance time is required. The unrequired tolerance time (e.g. the time window) in the time slot of the LIN bus can thus be utilized elsewhere.

The hardware-supported microcontrollers offer greater certainty that the provided time window (tolerance time) on the LIN bus will not be required. Header information and/or response information can advantageously be transmitted from or to the LIN master via the first data connection in this time window, e.g. without the provided timing on the LIN bus being delayed. If the LIN function is implemented on a modern microcontroller with a LIN stack hardware support, the 40% reserve, for example, or the tolerance time period in the timing is not or is not completely required. This time can be used e.g. for tunnelling (e.g. of header information and response information via the first data connection). The length of the available, free time window is e.g. the slot time duration (i.e. nominal transmission time of the header and response multiplied by a factor of 140%) minus the nominal transmission time of the header and response (e.g. maximum tolerance time). However, a shorter time window (e.g. shorter than the maximum tolerance time) can also suffice for the transmission of the header information and/or the response information from or to the LIN master via the first data connection, e.g. depending on the data transmission speed of the first data connection.

Alternatively or additionally to the use of hardware-supported microcontrollers, the availability of the free time window can be better guaranteed e.g. also with the use of software solutions on powerful computing units or computing units provided exclusively for the software solution.

Use of the proposed system, for example, can also enable the transmission of information via the first data connection (e.g. from or to the LIN master which is assigned to the LIN bus) within the provided time slot of the LIN bus.

According to one exemplary embodiment, it is provided that the system is designed to transmit both the frame via the LIN bus and header information and response information corresponding to the frame via the first data connection within a time duration of a predefined nominal time slot for the data transmission of a frame (i.e. header and response transmitted via the LIN bus). In other words, the unrequired tolerance time which the LIN transmission standard defines can be used for the transmission (e.g. tunnelling) of the header information and/or response information via the first data connection (which can be referred to e.g. as the backbone bus). This can enable respective header information and/or response information to be transmitted during the time duration of the time slot on the LIN bus also from or to the LIN master arranged in the central control unit.

It is provided, for example, that header information is embedded into a data packet of a standard of the first data connection for transmission via the first data connection. The first data connection can be e.g. a CAN bus and the header information can be embedded into a CAN frame. The response information can also be embedded accordingly into a respective data packet of the standard that is used. The smallest possible frame size in which the header information and/or response information can be transmitted (e.g. the smallest available frame size of the standard of the first data connection) can advantageously be chosen in the case of variable-length data packets for transmission via the first data connection.

An Ethernet connection can be used, for example, as the first data connection and the header information and/or the response information can be embedded into a 64-byte Ethernet frame for transmission via the Ethernet connection. The advantage can be that the header information and response information (e.g. in the case where the master itself transmits data) can be transmitted in each case completely in a 64-byte Ethernet frame and a transmission time via the first data connection can be very short. An Ethernet connection having a maximum of 10 Mbit/s, for example, can be used since this can enable a sufficiently fast data transmission and/or a more economical design of the first data connection.

A plurality of header information elements of the different LIN masters, for example, in the central control unit can be transmitted together in one message. Two (or three or more) headers, for example, can be transmitted in a common data packet via the first data connection.

A further aspect of the disclosure relates to a system in which, along with a LIN bus, at least one further legacy bus and/or additionally a discrete signal line with a corresponding control unit is connected to a zonal control module. Alternatively or additionally, the system can have a further zonal control module with a further legacy bus and/or a discrete signal line with a corresponding control unit. The system is designed to transmit information from the legacy bus and/or discrete signal line via the first data connection to the central control unit.

In the automotive sector, buses which have already been in use for some time in the vehicle sector, such as CAN buses, LIN buses, FlexRay buses, buses with discrete signals, I2C buses or the like are referred to as legacy buses. It can thus be provided, for example, that a LIN bus and a CAN bus with a corresponding CAN control unit are connected to the zonal control module.

The respective information from the legacy bus or the discrete signal line can be transmitted as packed into a data packet of the first data connection (e.g. can be embedded into an Ethernet frame and can thus be transmitted via the first data connection). It can be possible to assign a dedicated (e.g. virtual) MAC address for the Ethernet communication protocol to a respective control unit on the legacy bus by means of the zonal control module.

The system can thus enable different legacy buses to be coupled in a flexible manner to a backbone bus, e.g. an Ethernet connection, via the zonal control module, wherein the zonal control module enables an abstraction of the information from the control units of the legacy bus for transmission via the first data connection (e.g. Ethernet). This advantageously enables more flexible use of the proposed zonal system for the integration of different bus types. The use of the first data connection can e.g. also reduce a cable requirement of the respective legacy buses.

One aspect relates to a motor vehicle having a system according to the preceding or following description. It is provided, in particular, that at least two zonal control modules of the system are arranged in each case in different zones of the motor vehicle.

Alternatively, the system of the motor vehicle can also have only a single zone, for example a plurality of LIN slaves which are assigned to different LIN masters can be connected to the common LIN bus (or plurality of LIN buses) which are connected to the zonal control module of the system. In contrast to other LIN bus systems, for example, a required cable length or a required amount of cable can be reduced through the provision of one or more common LIN buses, e.g. in different zones of the system, and/or the tunneled data transmission via the first data connection. The installation of cables of the system in the vehicle can thus be simplified and/or costs of the system can be reduced.

It can be provided, for example, that a transmission cable of the first data connection and/or of the LIN bus is routed through a vehicle pillar of the motor vehicle. If the transmission cable of the first data connection (e.g. CAN bus or Ethernet cable) is routed through the vehicle pillar, a multiplicity of LIN bus cables in the vehicle pillar, for example, can be eliminated. Thanks to the system, not all of the LIN bus cables of the system have to be routed through the vehicle pillar, but rather the number of LIN bus cables in the vehicle pillar can be limited. This can advantageously result e.g. in a simpler routing of the cable harness through the vehicle pillar.

Alternatively, the proposed system can be used e.g. in other vehicles (e.g. aircraft or watercraft) also, and generally in local networks (e.g. in smart home devices or home networks, such as those defined by the HomeGrid standard).

One aspect relates to a method for activating at least a first LIN slave and a second LIN slave which are connected to a common LIN bus. The method comprises transmitting first header information from a first LIN master to the first LIN slave via the common LIN bus, and transmitting second header information from a second LIN master to the second LIN slave via the common LIN bus.

The method further comprises receiving response information from the first LIN slave corresponding to the first header information on the first LIN master, and receiving response information from the second LIN slave corresponding to the second header information on the second LIN master.

The method enables the use of a common LIN bus for two or more LIN masters. In other methods for data transmission on LIN buses, a separate LIN bus needs to be provided for each LIN master. As a result, the quantity of cables required for the multiplicity of LIN buses in other concepts can be very large. In contrast, the proposed method enables sparing use of cables, since not every LIN master requires a separate LIN bus. The method can be used advantageously in zonal systems in which LIN slaves of a LIN master are arranged on different common LIN buses and/or in systems having a small bus load if, for example, a LIN master does not continuously transmit information (e.g. header ID and/or data part) to assigned LIN slaves. If the method is used for systems which, for example, do not use every time slot provided in the LIN transmission method for data transmission, the method can be carried out without causing an overload of the LIN bus capacity.

Further details and aspects are mentioned in connection with the exemplary embodiments described above or below. In particular, the motor vehicle and the method can have features such as those already described in connection with the proposed system. The described exemplary embodiments can have one or more optional additional features which correspond to one or more aspects which are mentioned in connection with the proposed concept or with one or more exemplary embodiments described above or below (e.g. FIG. 1-10).

BRIEF DESCRIPTION OF THE DRAWINGS

Exemplary embodiments are explained in detail below with reference to the attached figures, in which:

FIG. 7 shows an example of a conventional system having a plurality of LIN buses;

10

Figure 9:
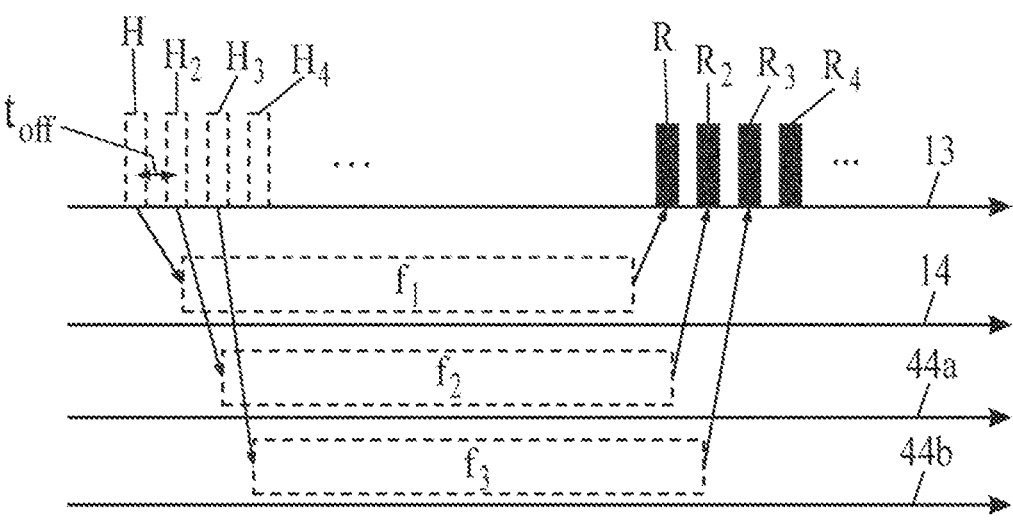
Figure 10:
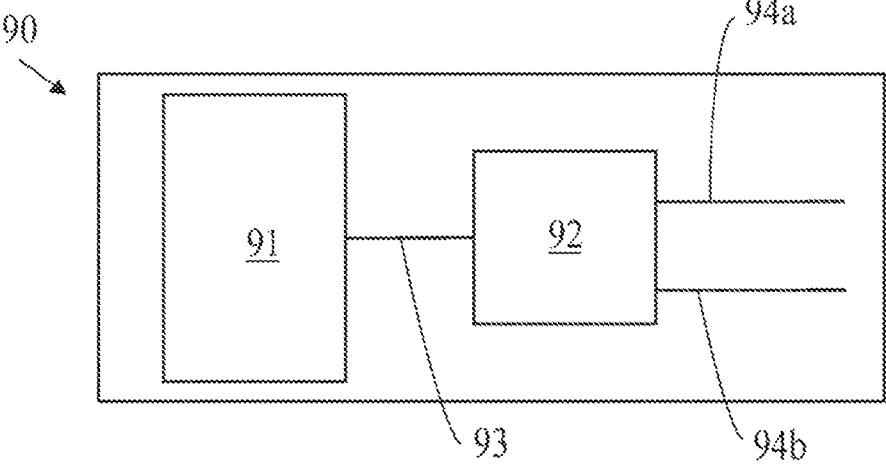

FIG. 8 shows an example of a transmission of header information and response information by means of tunnelling via a first data connection as a backbone bus;

FIG. 9 shows an example of a transmission of a plurality of frames via the first data connection to a plurality of LIN buses using a time offset; and FIG. 10 shows a schematic example of a system having a central control unit and a zonal control module to which two different legacy buses are connected.

DETAILED DESCRIPTION

Different exemplary embodiments will now be described in detail with reference to the attached drawings in which some exemplary embodiments are shown. The thickness dimensions of lines, layers and/or regions may be shown exaggeratedly in the figures for the sake of clarity. In the following description of the attached figures which merely show some exemplary embodiments, the same reference signs may denote the same or comparable components.

An element which is referred to as "connected" or "coupled" to another element can be directly connected or coupled to the other element or intermediate elements can be present. Unless otherwise defined, all terms used herein (including technical and scientific terms) have the same meaning that an average person skilled in the art in the field to which the exemplary embodiments relate attributes to them.

Figure 1:
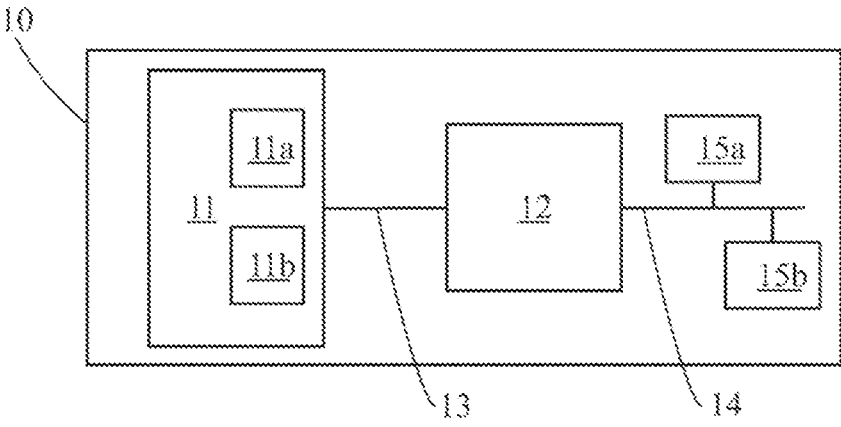
FIG. 1 shows a schematic example of a system having a central control unit and a zonal control module.

FIG. 1 shows a schematic example of a system 10 for data transmission, for example in a motor vehicle. The system comprises a central control unit 11 in which at least a first LIN master 11a and a second LIN master 11b are formed. The system 10 further comprises a zonal control module 12 which is coupled to the central control unit 11 by means of a first data connection 13. The system 10 further comprises a LIN bus 14 which is coupled to the zonal control module 12. A first LIN slave 15a connected to the LIN bus 14 is assigned to the first LIN master 11a, and a second LIN slave 15b connected to the LIN bus 14 is assigned to the second LIN master 11b. The system 10 can be used e.g. in motor vehicles.

Since it is possible by means of the proposed system 10 to arrange slaves 15a, 15b of different masters 11a, 11b on a common LIN bus 14, the system 10 can enable a reduction in a cable requirement for LIN buses. The use of the first data connection 13 can, for example, enable a zonalization of the LIN buses of a system 10, e.g. a LIN bus can thereby be arranged in each case in required zones only, said LIN buses being connected in each case to the central control unit (e.g. an integration platform) via the first data connection 13. A centralization of LIN masters can thus be enabled with simultaneous decentralization or zonalization of the LIN system.

The provision of the first data connection 13 with a higher data transmission speed than the LIN bus 14 enables the connection of further LIN buses to the zonal control module 12 without their transmission cables having to be routed in each case individually to the central control unit 11 with the associated LIN masters 11a, 11b. The system 10 can thereby enable a reduction in a cable requirement in cases where a plurality of LIN buses are used. The first data connection 13 can be used, for example, as a central data connection (e.g. central bus or backbone bus; e.g. Ethernet connection or CAN bus) in order to tunnel LIN information, in particular header information and response information, from the respective LIN bus to the associated LIN masters in the central control unit 11.

Alternatively, instead of the LIN bus, a different bus system can be provided which has a lower data transmission speed than the first data connection 13.

Further details and aspects are mentioned in connection with the exemplary embodiments described above or below. The exemplary embodiment shown in FIG. 1 can have one or more optional additional features which correspond to one or more aspects which are mentioned in connection with the proposed concept or with one or more exemplary embodiments described above or below (e.g. FIG. 2-10).

Figure 2:
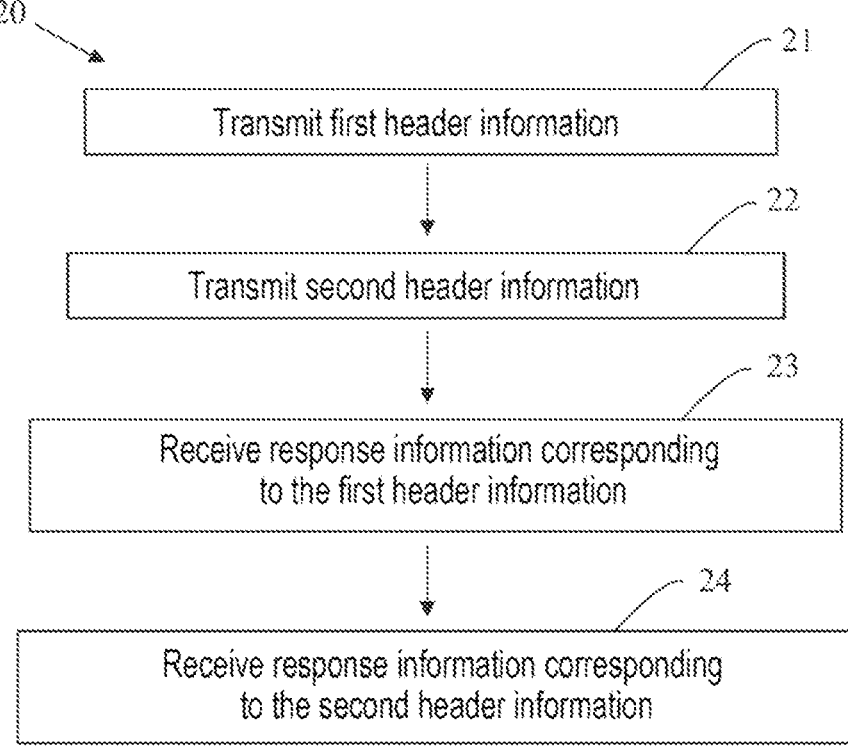
FIG. 2 shows a flow diagram of a method for activating a first LIN slave and a second LIN slave.

FIG. 2 shows a flow diagram of a method 20 for activating a first LIN slave and a second LIN slave. The method 20 comprises transmitting 21 first header information from a first LIN master to the first LIN slave via the common LIN bus and transmitting 22 second header information from a second LIN master to the second LIN slave via the common LIN bus. The method 20 further comprises receiving 23 response information from the LIN slave corresponding to the first header information on the LIN master and receiving 24 response information from the second LIN slave corresponding to the second header information on the second LIN master.

A method according to the proposed concepts can, for example, quite generally provide that information which is transmitted from the LIN master to the LIN slave comprises a header (e.g. identifier) and/or contents (e.g. data component). According to the method, command information, for example, can therefore also be transmitted from the LIN master to the LIN slave.

The method can advantageously enable the operation of e.g. a multiplicity of slaves which are assigned to two or more different masters on a single bus, e.g. LIN bus. A reduction in a physically required cable length can be enabled in this way, which is advantageous, particularly in vehicles with limited installation space.

Further details and aspects are mentioned in connection with the exemplary embodiments described above or below. The exemplary embodiment shown in FIG. 2 can have one or more optional additional features which correspond to one or more aspects which are mentioned in connection with the proposed concept or with one or more exemplary embodiments described above (e.g. FIG. 1) or below (e.g. FIG. 3-10).

Figure 3:
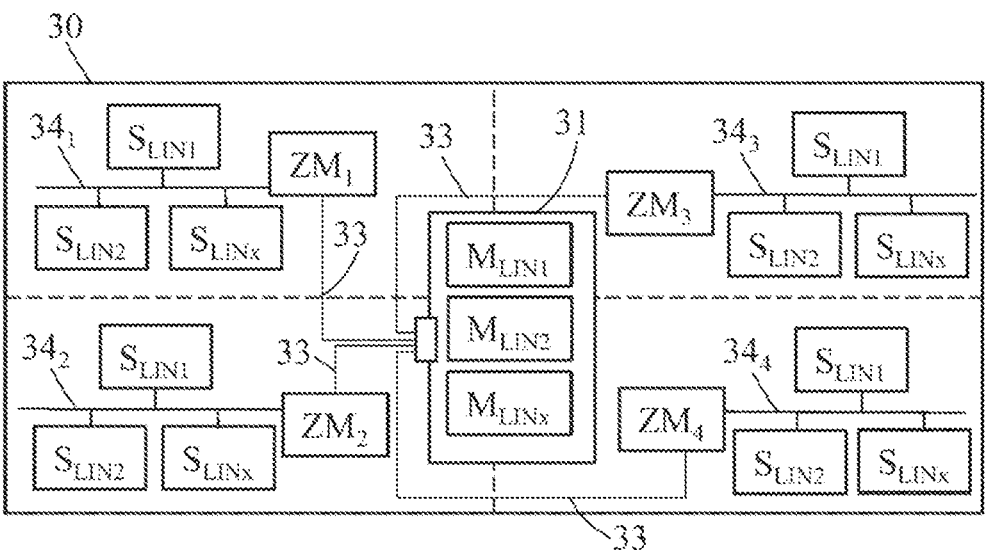
FIG. 3 shows a schematic example of a zonal system having four zonal control modules and three LIN masters.

FIG. 3 shows a schematic example of a zonal system 30 having four zonal control modules $ZM_1$ to $ZM_4$. The zonal control modules $ZM_1$ to $ZM_4$ are coupled to a central control unit 31 of the system 30 by means of a first data connection 33, e.g. an Ethernet connection. A LIN bus $34_1$ to $34_4$ (e.g. zonal LIN bus) is arranged on each of the zonal control modules $ZM_1$ to $ZM_4$. A plurality of LIN slaves $S_{LIN1}$ to $S_{LINx}$ which are assigned to different LIN masters $M_{LIN1}$ to $M_{LINx}$ can be connected to each of the zonal LIN buses $34_1$ to $34_4$. The LIN masters $M_{LIN1}$ to $M_{LINx}$ are arranged in the central control unit 31. A LIN slave $S_{LIN1}$, for example, which is assigned to the first LIN master $M_{LIN1}$, furthermore a second LIN slave $S_{LIN2}$, for example, which is assigned to the second LIN master $M_{LIN2}$, and a further LIN slave $S_{LINx}$ which is assigned to a further, e.g. third, LIN master $M_{LINx}$, are coupled to the first LIN bus $34_1$. Slaves are also assigned to the masters in each case on other LIN buses. The masters with the assigned slaves form e.g. functional LIN buses, wherein the LIN slaves are connected in each case to zonal LIN buses in a physically distributed manner. All masters of the system can be arranged in the central control unit 31.

A zonal LIN bus thus differs from a functional LIN bus e.g. in that the functional LIN bus has LIN slaves of a single LIN master only, whereas the zonal LIN bus connects LIN slaves of different LIN masters in one zone of the system. Precisely three LIN masters, for example, can be present in the system 31 having four zones, since this can offer advantages in terms of the bus utilization of the four LIN buses.

Use of the zonal system 31, for example, can result in a slimmer design of a cable harness in the vehicle. The zones are connected by a backbone bus (e.g. first data connection 31). Buses such as LIN, CAN and FlexRay dock on to zonal modules (e.g. zonal control modules $ZM_1$ to $ZM_4$). Other concepts, e.g. in the cable harness of a motor vehicle, use LIN buses which are functionally organized and in which each bus itself runs through the entire vehicle. In other concepts, the cable harness can become very thick and heavy and incurs high costs. According to other concepts, each LIN bus itself runs through the entire vehicle.

Precisely one LIN bus, or alternatively a plurality of LIN buses, can be connected in each case to a zonal control module $ZM_1$ to $ZM_4$. One LIN bus, for example, can be connected in each case to two first zonal control modules $ZM_1$ and $ZM_2$, and two LIN buses can be connected in each case to two further zonal control modules $ZM_3$ and $ZM_4$. A higher degree of system flexibility can thereby be achieved. Two LIN buses, for example, can be used on one zonal control module if a higher number of LIN information elements is to be transmitted to the LIN slaves of the zone concerned. A LIN bus overload, for example, can thereby be avoided.

The system 31 comprises the aspects of tunnelling of LIN information via the first data connection 33 and zonalization of the LIN buses. A new assignment of the LIN slaves to the buses takes place in the zonalization so that a plurality of LIN masters can (functionally) access the same physical LIN bus (zonally). The LIN information can be tunneled on the basis of unused time reserves (e.g. tolerance times) in the LIN protocol which are not required if the system is suitably designed. In particular, LIN information can be transmitted via the first data connection 33 to or from a LIN master in inter-frame spaces of the protocol of the LIN buses within a LIN frame.

As also shown below in FIG. 4, two or more LIN buses can also be connected in each case to the zonal control module shown in FIG. 3. Precisely one LIN bus, for example, can be connected in each case to two of the zonal control modules (as shown in FIG. 3) and two LIN buses can be connected in each case to two other of the zonal control modules (as shown e.g. in FIG. 4).

Further details and aspects are mentioned in connection with the exemplary embodiments described above or below. The exemplary embodiment shown in FIG. 3 can have one or more optional additional features which correspond to one or more aspects which are mentioned in connection with the proposed concept or with one or more exemplary embodiments described above (e.g. FIG. 1-2) or below (e.g. FIG. 4-10).

Figure 4:
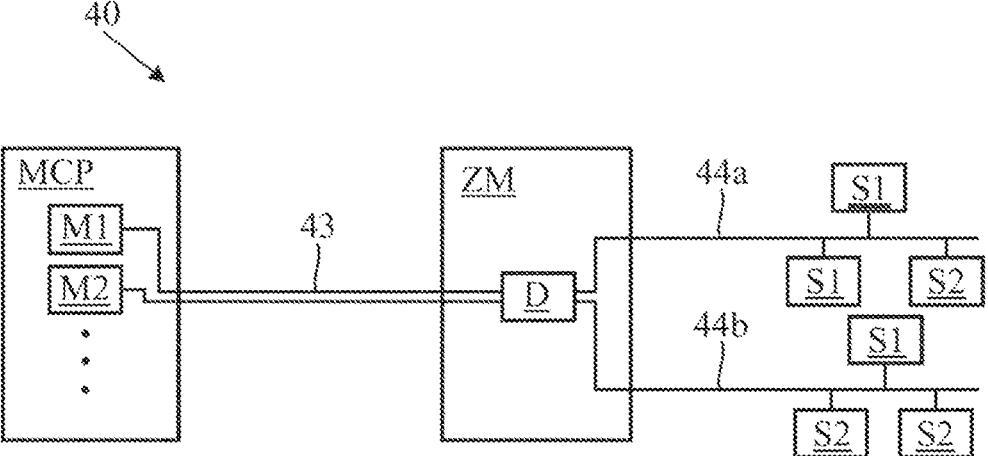
FIG. 4 shows a schematic example of a system having a zonal control module to which two LIN buses are connected.

FIG. 4 shows a schematic example of a system 40 having a zonal control module ZM to which two LIN buses 44a, 44b are connected. Two or more masters M1, M2 are arranged in a modular control platform MCP (e.g. high-integration platform; e.g. central control unit). A first data connection 43 connects the modular control platform MCP to a zonal module ZM (e.g. zonal integration module; e.g. zonal control unit).

Slaves S1, S2 which are assigned to the first master M1 or to the second master M2 in the modular control platform MCP are connected in each case to both the first LIN bus 44a and to the second LIN bus 44b. Since LIN information for the first or second LIN bus 44*a*, 44*b* is received on the zonal control module ZM, a dispatcher device D is provided in the zonal control module ZM which controls when specific LIN information is transmitted from the zonal control module ZM onto the respective LIN bus 44*a*, 44*b*. A separate dispatcher can be provided, for example, in the dispatcher device D for each LIN bus 44*a*, 44*b* of the zonal control module ZM and/or further elements (e.g. elements of a transmission branch from the first data connection to the LIN bus, as also shown e.g. in FIG. 5*a*; e.g. a filter and/or a queue and/or a transmit/receive module). According to the proposed concept with divided, zonal LIN buses, for example, a resolution of time constraints in the masters and an introduction of a dispatcher for the zonal LIN buses are provided, e.g. with a queue as a quasi-dynamic schedule table.

Further details and aspects are mentioned in connection with the exemplary embodiments described above or below. The exemplary embodiment shown in FIG. 4 can have one or more optional additional features which correspond to one or more aspects which are mentioned in connection with the proposed concept or with one or more exemplary embodiments described above (e.g. FIG. 1-3) or below (e.g. FIG. 5*a*-10).

Figure 5A:
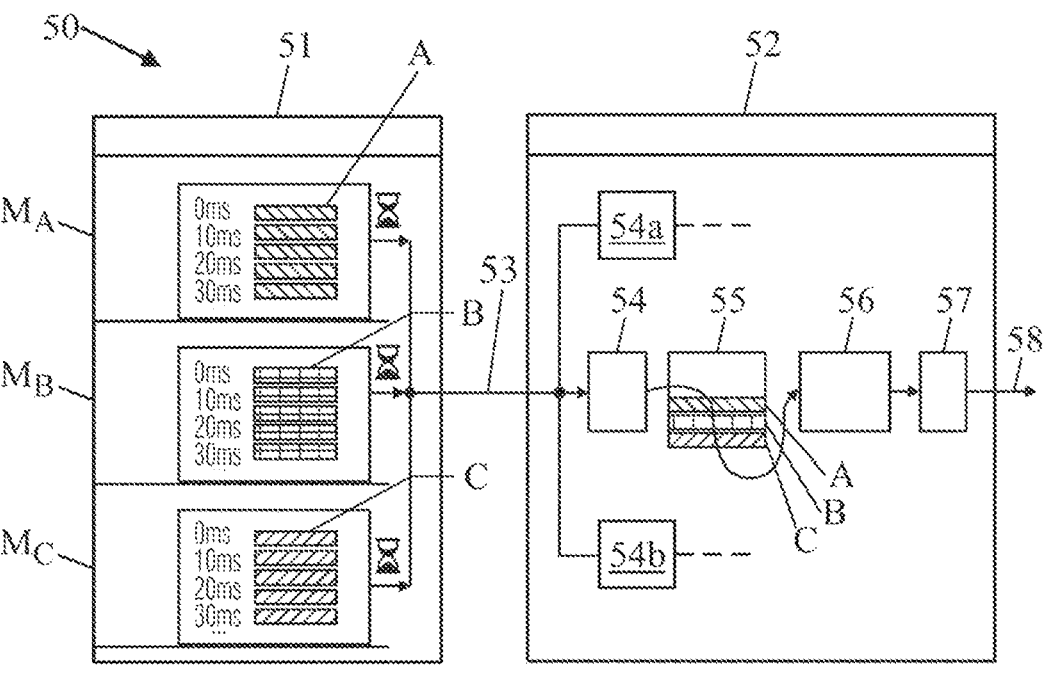
FIG. 5a, b show an example of a data transmission in a zonal system having synchronous operation.

FIG. 5*a, b* show an example of a data transmission in a zonalized system 50 in synchronous operation. The zonalized system 50 comprises a central control unit 51 and a zonal control module 52 which are connected via a first data connection 53. A first LIN master $M_A$ which transmits LIN information A (e.g. header and data information) according to a time protocol (e.g. LIN schedule table) is formed in the central control unit 51. A second LIN master $M_B$ which transmits LIN information B is formed accordingly, and also a third LIN master $M_C$ which transmits LIN information C (e.g. header and data information) according to a time protocol (e.g. schedule). The LIN information can be transmitted via the central control unit 51 onto the first data connection 53. The time protocol can provide, for example, that, in the normal case, the LIN information A, B, C is transmitted in 5 ms or 10 ms time slots.

The zonal module 52 shown presents a signal processing branch for a zonal LIN bus 58. The signal branch comprises a filter 54, a LIN bus schedule module 55, a dispatcher 56 and a transmit/receive module 57 (e.g. transceiver; e.g. physical bus driver), wherein header information can be exchanged via the signal branch between the first data connection 53 and the zonal LIN bus 58. Further filters 54*a*, 54*b* of further signal branches which can lead to further zonal LIN buses (not shown in FIG. 5*a*) which can similarly be connected to the zonal control module 52 are further presented.

The synchronous operation provides that a LIN master $M_A$, $M_B$, $M_C$ transmits further header information only if it has received response information from the LIN slave corresponding to previously transmitted header information. As a result, a maximum of one header per master $M_A$, $M_B$, $M_C$ can be present in a queue in the schedule module 55 (e.g. header information A from the first LIN master $M_A$, header information B from the second LIN master $M_B$, and third header information C from the third LIN master $M_C$ can be present in the queue).

If, for example, only one of the three LIN masters transmits header information, the corresponding response information can be transmitted within the intended time slot via the first data connection 53 to the intended LIN slave on the zonal LIN bus 58, and the corresponding response information can also be sent back again via the first data connection 53 to the LIN master.

If all three LIN masters $M_A$, $M_B$, $M_C$ simultaneously transmit header information A, B, C, the function of the queue (e.g. buffer memory) in the schedule module 55 enables this information to be temporarily stored and transmitted according to a transmission protocol to the LIN bus 58 when the latter is available.

The original, functional schedules of the LIN masters can run in a centralized manner (e.g. on an integration platform) and can be executed e.g. in parallel as a software implementation. The LIN masters can tunnel (Tx mode) LIN headers via the first data connection 53 (e.g. backbone bus), but can stop the schedule until they have received the response to the header. LIN headers from different LIN masters can be stored in chronological order in an Rx buffer (e.g. buffer memory of the zonal control module 52). From the buffer, the oldest header can be transmitted from the Rx buffer (e.g. first-in-first-out (FIFO) principal), e.g. by means of the dispatcher 56. As soon as a response to a header has been completely and correctly transmitted onto the physical LIN bus, the response can be transmitted via the backbone bus to the respective master.

Figure 5B:
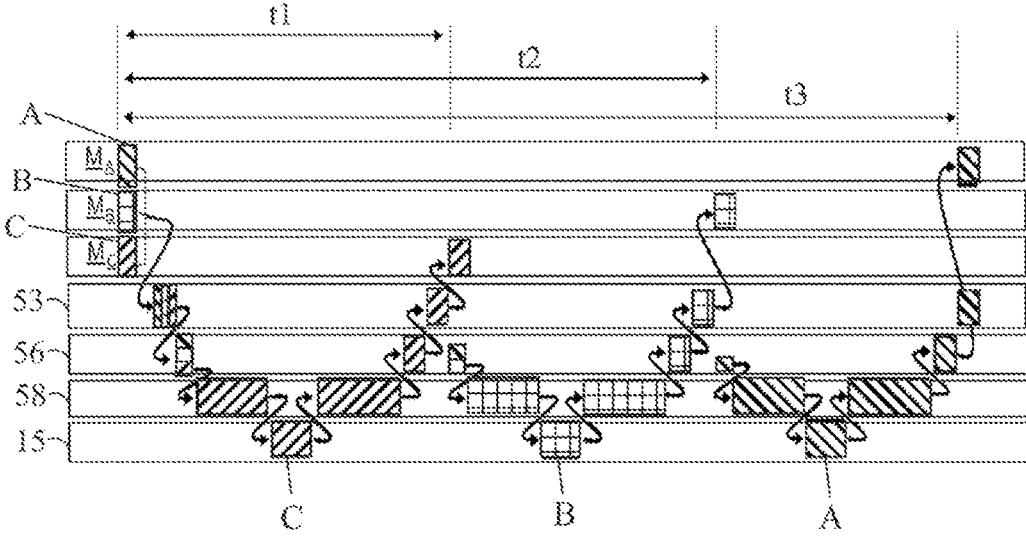

FIG. 5*b* shows a schematic time characteristic when all three masters $M_A$, $M_B$, $M_C$ in each case simultaneously transmit LIN information A, B, C via the first data connection 53 to the zonal module 52. The figure shows that the dispatcher 56 first selects the LIN information C from the queue in order to transmit it onto the LIN bus 58. A connected LIN slave 15 can process the LIN information (e.g. header information) C there and transmit it back to the LIN master $M_C$ (as response information). A time duration t1 which can correspond to a time slot of the LIN protocol (e.g. 10 ms) can be provided for this purpose. The second LIN information B can be transmitted from the dispatcher 56 onto the LIN bus 58 as soon as the latter is free, e.g. in the time slot following the transmission of the first LIN information A. The third information A can be transmitted accordingly from the dispatcher 56 onto the LIN bus 58 as soon as the latter is free, e.g. in the time slot following the transmission of the second LIN information B.

The example shows a worst case for the synchronous transmission in which a collision of headers takes place. Three headers are transmitted here simultaneously. The response to the first header of the first master $M_A$ is delayed by two time slots on the zonal LIN 58. The response to the header of the second master $M_B$ is delayed by one time slot on the zonal LIN, whereas the header of the third master $M_C$ can be handled immediately. The masters in the integration platform and the underlying functions are designed accordingly so that they can cope with sporadic delays in the responses. For the masters, for example, the close tie to the original LIN time slots (e.g. 5 or 10 ms slots) can also be dissolved. The queue can be designed in synchronous mode to be no longer than the number of masters (e.g. a correspondingly small buffer memory can suffice; e.g. the capacity of the buffer memory can be designed to be able to temporarily store a maximum number of header information elements corresponding to the number of LIN masters of the system; e.g. a reserve can be provided in the buffer memory so that time delays can be compensated in the dispatcher).

Further details and aspects are mentioned in connection with the exemplary embodiments described above or below. The exemplary embodiment shown in FIG. 5*a, b* can have one or more optional additional features which correspond to one or more aspects which are mentioned in connection with the proposed concept or with one or more exemplary embodiments described above (e.g. FIG. 1-4) or below (e.g. FIG. 6-10).

Figure 6:
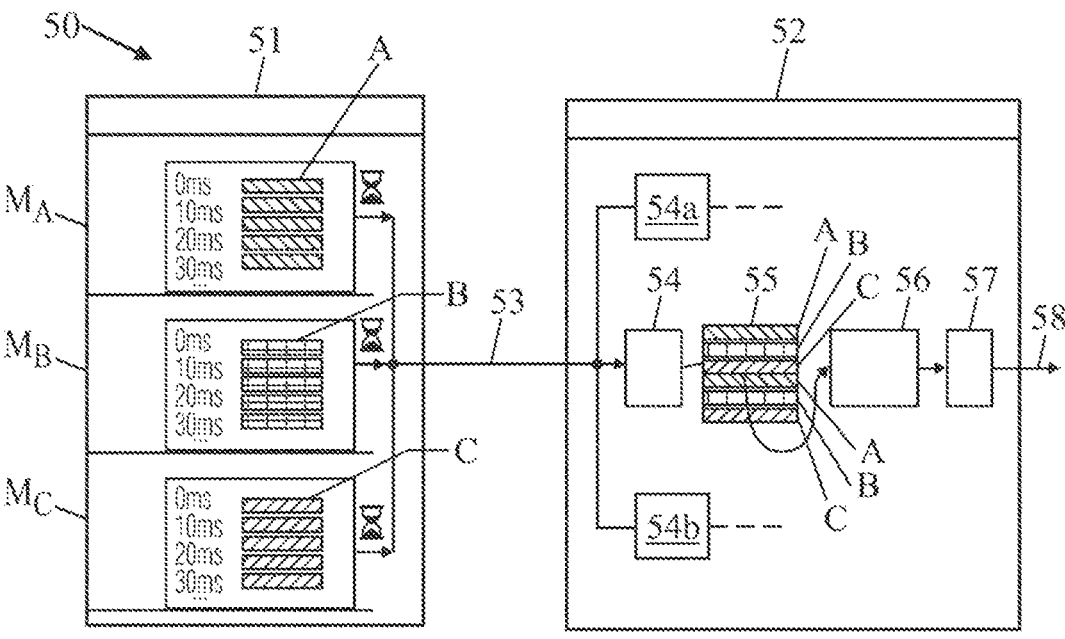
FIG. 6 shows an example of a data transmission in a zonal system in asynchronous operation.

FIG. 6 shows an example of a data transmission in a zonalized system 50 in asynchronous operation. In contrast to synchronous operation, it is provided that the LIN masters tunnel LIN headers via the first data connection 53 (e.g. backbone bus in transmit mode Tx), but do not wait for the response (Rx) of the respective LIN slave before they transmit the further LIN information. Since an unpredictable sequence is possible here, it can be provided for the assignment of response information to header information that the response is transmitted with the header ID via the backbone bus back to the respective master.

In asynchronous operation, the queue (e.g. in the schedule module 55) can become even greater than the number of participants (e.g. a plurality of LIN information elements A (e.g. two, three or more), and a plurality of LIN information elements B, C can be temporarily stored). The system 50 can be designed, for example, in such a way that the permissible bus load the zonal LIN buses is not exceeded on average. A limit which is less than 100% (e.g. less than 90%, less than 80% or less than 70%) can be set for the permissible bus load.

The bus load of a zonal LIN bus can have impacts on the system. With normal utilization (e.g. bus load <95%), it can be provided that the queue does not overflow, with average cycle times being e.g. the cycle times of the functional main schedule, so that the system does not have to be synchronized. Waiting times can be inserted, e.g. in the schedule modules, if required in order to prevent temporary LIN bus overload. Average cycle times, for example, can thereby be maintained with smaller fluctuations. With a high utilization, e.g. with a bus load >95%, use of an algorithm can be provided e.g. to remove duplicate messages from the queue and prevent an overflow. The system can be designed so that short dead times occur on the physical LIN bus (e.g. zonal LIN bus 58). The system does not then have to be synchronized; e.g. the cycle times are subject to greater fluctuations.

Synchronous Tx/Rx operation (see also FIG. 5a, b) can be referred to as operation with elasticity. A zonal LIN node arrangement is provided in which e.g. no PIDs with duplicate assignment are permitted in a zonal LIN bus system. The schedules can be synchronized with one another in order to prevent dead times and temporary overload on the bus. Self-synchronization, for example, can be used. Conversely, new function timing can be provided in asynchronous Tx/Rx operation. In the zonal LIN node arrangement, for example, no PIDs with duplicate assignment can be permitted in a zonal LIN bus system and the bus utilization has e.g. a strong influence on compliance with the timing requirements.

Further details and aspects are mentioned in connection with the exemplary embodiments described above or below. The exemplary embodiment shown in FIG. 6 can have one or more optional additional features which correspond to one or more aspects which are mentioned in connection with the proposed concept or with one or more exemplary embodiments described above (e.g. FIG. 1-5b) or below (e.g. FIG. 7-10).

FIG. 7 shows an example of a conventional system having a plurality of LIN buses 140, 140b, 140n according to the prior art. The LIN buses 140, 140b, 140n are all connected directly to a control unit 110 in which respective LIN masters 110, 110b, 110n assigned to the buses are arranged. In contrast to the proposed zonalized system 10 with the first data connection 13, the transmission cable requirement increases as a result with each additional LIN bus, since no common transmission cable can be used for a plurality of LIN buses. A separate LIN bus must further be used for each LIN master according to the prior art.

FIG. 8 shows an example of transmission of header information H and response information R via a first data connection 13 (e.g. a CAN bus or Ethernet connection; see upper half of FIG. 8) and a LIN bus 14. A time slot 80 is used to transmit a frame comprising a header (header information H) and a response or slave response (response information R) via the LIN bus 14 (see lower half of FIG. 8). The length of the time slot 80 shown is given purely by way of example and can be e.g. 5 ms or other time durations instead of the 10 ms shown.

As shown, a first part of the time slot 80 is sufficient for transmitting the header information H and response information R via the LIN bus 14, so that a free time window 81 exists until the start of the next time slot and e.g. can be used. The duration of the time window 81, for example, is around 33% of the duration of the time slot 80 (e.g. at most 40% and/or at least 20% of the duration of the time slot 80). The free time window 81 can be provided if the tolerance times defined in the LIN transmission standard are not required for the transmission of the LIN frame.

The free time window 81 in which no information is transmitted via the LIN bus 14 can be used to transmit the response information R via the first data connection 13 back to the LIN master in the central control unit (e.g. tunnelling of the response information R). Further header information $H_{n+1}$ can be transmitted for the transmission of a header via the LIN bus 14 in the next time slot from the LIN master to the zonal control module via the first data connection 13. The header information R for the illustrated LIN frame of the time slot 80 has correspondingly been transmitted in a free time window of the previous time slot (see header information H on the first data connection 13 temporally before the start of the time slot 80). The time duration from the start of the transmission of the header information H via the first data connection 13 to the end of the reception of the associated response information R via the first data connection 13 can thus be less than the time duration of the time slot 80.

A predetermined time slot (e.g. a 5 ms or 10 ms slot provided according to the LIN transmission) can be used, for example, for the transmission of the header information and the response information via the LIN bus (e.g. LIN frame). It is further provided that the response information and/or further header information are transmitted via the first data connection within a time frame reserved in the time slot. The availability of the time window can be enabled in that a tolerance time reserved in the time slot according to the LIN standard is not required for the transmission on the LIN bus. This can be achieved, for example, as already described, by using hardware-based microcontrollers in the implementation of the LIN master and/or LIN slave.

It can be provided, for example, that the header is transmitted on the LIN bus at the start of the time slot. The free time window can therefore be provided at the end of the time slot. The response can be received via the LIN bus on the zonal control module before the time window is temporally reached within the time slot, so that corresponding response information can be transmitted via the first data connection to the LIN master in the free time window. The header information for the subsequent time slot is also transmitted e.g. within the time frame via the first data connection to the zonal control module, as shown in FIG. 8, so that a corresponding next header can be transmitted via the LIN bus in a subsequent time slot. Overall, the header information and the response information of a frame (e.g. LIN bus frame) can therefore be transmitted by the LIN master and can again be received on the LIN master via the first data connection within a provided time duration of the time slot (e.g. shifted to the actual time slot on the LIN bus). A time delay in the activation of the LIN slave can thereby be avoided even if the first data connection is used.

According to one exemplary embodiment, it is provided that the reserved time window has a time duration of at least 0.2 ms (or of at least 0.5 ms, of at least 1 ms, of at least 1.5 ms or of at least 2 ms) and/or of at most 5 ms (or of at most 4 ms or of at most 3.5 ms). The header information and response information, for example, can be transmitted within this time via the first data connection between the central control unit and the zonal control module.

Further details and aspects are mentioned in connection with the exemplary embodiments described above or below. The exemplary embodiment shown in FIG. 8 can have one or more optional additional features which correspond to one or more aspects which are mentioned in connection with the proposed concept or with one or more exemplary embodiments described above (e.g. FIG. 1-7) or below (e.g. FIG. 9-10).

FIG. 9 shows an example of a transmission of a plurality of frames $f_1$, $f_2$, $f_3$ via the first data connection 13 to a plurality of LIN buses 14, 44a, 44b using a time offset $t_{off}$. The time offset $t_{off}$ can describe e.g. the time duration between the start of the first header information H and the start of the next header information $H_2$. The duration of the transmission of header information via the first data connection 13 can, for example, be between 50 μs and 60 μs and the time offset $t_{off}$ can be 100 μs. The time offset $t_{off}$ can define, for example, a time duration between the end of the transmission of the header information H and the start of the transmission of the header information $H_2$ and can be e.g. more than 10 μs and/or less than 50 μs.

The header information H, $H_2$, $H_3$ is transmitted from different LIN masters in succession via the first data connection 13 to the different LIN buses 14, 44a, 44b assigned in each case to the LIN masters. The header information H, $H_2$, $H_3$ can also be transmitted, for example, from a single LIN master in each case to different zonal control modules or to one zonal control module (e.g. a plurality of LIN buses and/or LIN slaves assigned to the LIN master can be connected to the one zonal control module; e.g. the header information H, $H_2$, $H_3$ can be temporarily stored in a buffer memory of the zonal control module until it is transmitted via a LIN bus). As shown, the slower data transmission of the frames $f_1$, $f_2$, $f_3$ via the LIN buses 14, 44a, 44b takes longer than the data transmission of header information and response information via the first data connection 13. After the transmission of the first header information H from a first LIN master via the first data connection 13, further information $H_2$, $H_3$, etc., can therefore be transmitted from further LIN masters, e.g. as long as the frame $f_1$ is transmitted via the LIN bus 14. A maximum possible number of header information elements H, $H_2$, $H_3$, etc., for example, which are transmitted via the common data connection 13 can depend on the data transmission speed and/or the length of the time offset $t_{off}$ and/or on the duration of the frame $f_1$. The time offset $t_{off}$ can be chosen, for example, in such a way that response information can be transmitted via the first data connection 13 in each case between the transmission of two consecutive header information elements in order to achieve e.g. a constantly alternating transmission of header information and response information via the first data connection 13.

The synchronization of the LIN masters with offset $t_{off}$ can enable e.g. collision-free scheduling on the backbone bus (e.g. first data connection 13). The time slots of the LIN buses 14, 44a, 44b are, for example, arranged as shifted in each case by the time offset. The use of the synchronization or time offset can enable the plurality of LIN masters to subsequently transmit further headers of subsequent LIN frames for the assigned LIN buses 14, 44a, 44b via the first data connection 13 without producing collisions on the first data connection 13.

According to one exemplary embodiment, it is provided that the method further comprises transmitting second header information from a second LIN master of the central control unit via the first data connection. The two header information elements are transmitted e.g. temporally shifted with a time offset which is chosen depending on the data transmission speed of the first data connection.

The first header information is transmitted e.g. to a LIN slave on a first LIN bus and the second, time-shifted, header information is transmitted to a LIN slave on the same first LIN bus or alternatively on a second LIN bus (e.g. coupled to the same or to a different zonal control module). Since the data transmission speed of the first data connection is greater than that of the LIN buses, both header information elements can be transmitted on the common data line. A collision of header information elements on the first data connection can be avoided by using the time offset.

A time offset, for example, having a duration of at least 20 μs (or at least 50 μs or at least 100 μs) can be chosen between the transmission of two header information elements via the first data connection. A time offset can also be chosen, for example, in such a way that the respective response information elements can be transmitted via the first data connection back to the respective LIN masters without collision with subsequent header information on the first data connection. Latency times, for example, due to collisions can thereby be avoided.

Examples therefore relate in general to a concept for tunnelling a LIN bus 14 via a backbone bus (e.g. the first data connection 13, e.g. a CAN bus or an Ethernet connection). In order to enable e.g. slimmer and more economical and/or better automated manufacture of a cable harness, one or more backbone buses (e.g. first data connection) are introduced, via which buses such as e.g. LIN, CAN, FlexRay and also discrete signals can be tunneled.

Tolerances set out in the LIN specification, in particular, can be used. These tolerances (e.g. free time window 51) are e.g. no longer required on the LIN bus in modern, available microcontrollers (μCs) with hardware LIN logic (e.g. hardware-supported). A synchronization can be performed with a time offset of the LIN masters of those buses which are intended to be jointly tunneled. A time buffer, for example, is provided for the tunnelling of LIN buses (e.g. the time window 51). If a plurality of LIN buses are tunneled on the same backbone bus, collisions can be avoided by means of the proposed concepts. A plurality of LIN buses, for example, can be routed from a central control unit to a tailgate control unit and/or roof control unit.

Further details and aspects are mentioned in connection with the exemplary embodiments described above or below. The exemplary embodiment shown in FIG. 9 can have one or more optional additional features which correspond to one or more aspects which are mentioned in connection with the proposed concept or with one or more exemplary embodiments described above (e.g. FIG. 1-8) or below (e.g. FIG. 10).

FIG. 10 shows a schematic example of a system 90 having a central control unit 91 and a zonal control module 92 to which a plurality of different legacy buses are connected.

For an efficient data connection, the zonal control module 92 is connected to the central control unit 91 via a first data connection 93 (e.g. faster data transmission than via the legacy buses).

A first legacy bus 94*a* and a second legacy bus 92*b* (or alternatively a discrete signal line 92*b* are connected to the zonal control module 92. The first legacy bus 92*a* can be e.g. a LIN bus, and the second legacy bus 92*b* can be e.g. a CAN bus. Via the first data connection 93, the control units of the legacy buses 94*a*, 94*b* can in each case be enabled to transmit information to the central control unit 91 and to receive information from the latter (e.g. communication between the LIN master in the central control unit 91 and a LIN slave on the LIN bus 94*a*).

In a system 90 having two zonal control modules, for example, a plurality of buses can be connected in each case to both zonal control modules, for example a LIN bus, a CAN bus and a FlexRay bus can be connected to the first zonal control module, and a LIN bus, a CAN bus and a zonal Ethernet connection can be connected to the second zonal control module. By bundling all functions in the central control unit 91, a high-level functionality can be enabled there (e.g. service-oriented architecture SOA). The system 90 can be connected e.g. efficiently (e.g. wirelessly) to a backend via the central control unit 91, so that one common backend connection can suffice for all functions of the individual control units on the buses of the zonal control module.

Through the combination of the zonal control modules with the first data connection (e.g. backbone bus), the present legacy functions can be implemented together with their legacy control units (e.g. LIN or CAN control unit) with comparatively little outlay on a zonal physical on-board power supply architecture. Cost benefits can be achieved, since the cable harness can be manufacturable e.g. in an automated manner. The system can enable a high degree of scalability and flexibility. Mixed mode, for example, and discrete signal buses can be jointly connected to the zonal control module. In other words, a central docking point of the "All-IP" and "Service-Oriented Architecture" environment onto the legacy environment can be implemented via the backbone bus (in a signal-based manner), so that older technologies of the vehicle domain can be combined with modern technologies.

The system 90 proposed in FIG. 10 can be used in a motor vehicle e.g. for a zonal on-board power supply system with legacy abstraction and backbone bus in a motor vehicle. A multiplicity of different electrical/electronic components, for example, can be integrated in this way into modern on-board power supply systems (e.g. with an Ethernet connection). In the system shown, the zonal control module 92 can be referred to as e.g. a legacy abstraction switch (e.g. universal gateway for different legacy buses). One advantage can be that a configurable zonal control module 92 can be used which can be programmed accordingly on the basis of legacy buses 94*a*, 94*b* that are actually used (e.g. operation as a gateway for the respective legacy buses 94*a*, 94*b* can be enabled by means of a corresponding software setting). A universal zonal control module 92 of this type can offer the advantage that it can be used in a wide variety of configurations, as a result of which e.g. cost savings can be made.

Further details and aspects are mentioned in connection with the exemplary embodiments described above or below. The exemplary embodiment shown in FIG. 10 can have one or more optional additional features which correspond to one or more aspects which are mentioned in connection with the proposed concept or with one or more exemplary embodiments described above (e.g. FIG. 1-9) or below.

In terms of the error diagnostics in proposed systems and methods which can follow the principles of error diagnostics in accordance with the LIN specification, it can be provided to transmit error information also via the first data connection. Each LIN node performs error detection diagnostics e.g. independently on the (zonal) LIN bus. The error evaluation is performed centrally by the master. The master also reads, e.g. on the bus, and evaluates all communication on the bus. The slave also reads, e.g. on the bus, and evaluates all messages which it has transmitted and received itself; the slave enables transmission of the error status in the payload (response) within an error bit of an unconditional frame. The master evaluates e.g. the error bits of the slaves. Error detection is performed in the slave, e.g. independently from the zonalization, via the payload in the slave response. Error detection for the master is taken over by the dispatcher e.g. in the case of zonalization and is transmitted as a separate status message to the central LIN master. The system can be designed for error diagnostics so that the LIN master can be informed or can inform itself on the integration platform (e.g. central control unit) regarding the state/status of the backbone communication (e.g. communication via the first data connection).

One proposed aspect relates to the zonalization of a functional LIN bus architecture in the motor vehicle. In contrast to other LIN systems, it can be provided that LIN slaves of different LIN Masters share zonal LIN buses so that e.g. a system with distributed LIN slaves can be implemented with a small cable requirement for LIN buses. The multiplicity of communication buses in a vehicle, for example, can be converted from a functional connection of the control units according to other concepts to a zonal connection of the control units, which can result in a reduction of the cable harness and/or an increase in flexibility. In particular, a concept is proposed for the connection of LIN buses.

The invention claimed is:

1. A system for data transmission in a motor vehicle, the system comprising:

a central control unit comprising at least a first LIN master and a second LIN master;

a first zonal control module operably coupled to the central control unit via a first data connection; and a first LIN bus operably coupled to the first zonal control module;

wherein a first LIN slave connected to the LIN bus is assigned to the first LIN master, wherein a second LIN slave connected to the LIN bus is assigned to the second LIN master;

wherein the first zonal control module is configured to control a temporal sequence in which headers of the first LIN master and the second LIN master received on the first zonal control module are transmitted from the first zonal control module onto the first LIN bus according to a communication behavior; and wherein the communication behavior provides synchronous transmission in which a LIN master transmits no further header as long as said LIN master has not received a response corresponding to a most recently transmitted header which is transmitted from a LIN slave via the first LIN bus, the first zonal control module, and the first data connection to the LIN master.

2. The system as claimed in claim 1, further comprising:
at least one further zonal control module operably coupled to the central control unit via the first data connection; and
at least one further LIN bus operably coupled to the further zonal control module, wherein at least one LIN slave assigned to the first LIN master or assigned to the second LIN master is connected to the further LIN bus.

3. The system as claimed in claim 2, wherein each zonal control module of the first zonal control module and the at least one further zonal control module is configured to filter out headers of the first LIN master and the second LIN master transmitted via the first data connection which are addressed to LIN slaves connected to a respective LIN bus of the zonal control module.

4. The system as claimed in claim 1, wherein a single LIN bus is coupled to the first zonal control module.

5. The system as claimed in claim 1, wherein:
the communication behavior provides asynchronous transmission in which a LIN master transmits a further header even if the LIN master has not received a response corresponding to a most recently transmitted header, and
the first zonal control module transmits the response together with an associated header ID via the first data connection to the LIN master in order to enable an assignment of the response to the most recently received header on the LIN master.

6. The system as claimed in claim 1, wherein the system has a plurality of LIN masters in the central control unit and a plurality of zonal control modules with respective LIN buses.

7. The system as claimed in claim 6, wherein a quantity of LIN buses of the system is greater than a quantity of LIN masters of the system.

8. The system as claimed in claim 1, wherein the first zonal control module has a buffer memory configured to temporarily store a header received from a LIN master until the first LIN bus is available for transmission of the header received from the LIN master.

9. The system as claimed in claim 1, wherein the first zonal control module is configured to transmit error information relating to the first LIN bus and/or the first data connection to the first LIN master or the second LIN master of the central control unit.

10. The system as claimed in claim 1, wherein a data transmission speed of the first data connection between the central control unit and the first zonal control module is higher than a data transmission speed of the first LIN bus.

11. The system as claimed in claim 1, wherein the first data connection is configured according to an Ethernet standard, a CAN standard, a FlexRay standard, a radio-based transmission standard, a PCI Express standard or a home network standard.

12. The system as claimed in claim 1, wherein at least one of a group including the first LIN master, the second LIN master, the first LIN slave and the second LIN slave includes hardware-supported microcontrollers.

13. The system as claimed in claim 1, wherein the system is configured to transmit a frame via the first LIN bus and header information and response information corresponding to the frame via the first data connection within a time duration of a predefined time slot for data transmission of a frame via the first LIN bus.

14. The system as claimed in claim 1, wherein the system is configured to transmit header information from both the first LIN master and the second LIN master in a common data packet via the first data connection.

15. The system as claimed in claim 1, wherein one or both of a legacy bus and a discrete signal line with a corresponding control unit is further connected to the first zonal control module, or the system has a further zonal control module with one or both of a legacy bus and a discrete signal line with a corresponding control unit, wherein the system is designed to transmit information from the legacy bus via the first data connection to the central control unit.

16. A motor vehicle having a system as claimed in claim 1, wherein at least two zonal control modules of the system are arranged in each case in different zones of the motor vehicle.

17. A method for activating at least a first LIN slave and a second LIN slave which are connected to a common LIN bus, the method comprising:
transmitting first header information from a first LIN master to the first LIN slave via the common LIN bus;
transmitting second header information from a second LIN master to the second LIN slave via the common LIN bus, wherein the first LIN master and the second LIN master are arranged on a central control unit, wherein a zonal control module is operably coupled to the central control unit via a first data connection, and wherein the common LIN bus is operably connected to the first zonal control module;
receiving, via the common LIN bus, response information from the first LIN slave corresponding to the first header information on the first LIN master,
receiving, via the common LIN bus, response information from the second LIN slave corresponding to the second header information on the second LIN master; and
controlling, with the first zonal control module, a temporal sequence in which the first header information of the first LIN master and the second header information of the second LIN master received on the zonal control module are transmitted from the zonal control module onto the first LIN bus according to a communication behavior, and wherein the communication behavior provides (1) synchronous transmission in which a LIN master transmits no further header as long as said LIN master has not received a response corresponding to a most recently transmitted header, or (2) asynchronous transmission in which a LIN master transmits a further header even if the LIN master has not received a response corresponding to a most recently transmitted header.

* * * * *